(12) United States Patent
Heiner

(10) Patent No.: US 6,370,235 B1
(45) Date of Patent: Apr. 9, 2002

(54) UNSOLICITED PHONE CALL REMOVAL SYSTEM

(75) Inventor: Jeffrey N. Heiner, 17440 N. Tatum Blvd. #212, Phoenix, AZ (US) 85032

(73) Assignee: Jeffrey N. Heiner, Phoenix, AZ (US)

( * ) Notice: Subject to any disclaimer, the term of this patent is extended or adjusted under 35 U.S.C. 154(b) by 0 days.

(21) Appl. No.: 09/300,460

(22) Filed: Apr. 28, 1999

(51) Int. Cl.[7] .............................. H04M 1/64; H04M 3/42
(52) U.S. Cl. .................... 379/67.1; 379/67.1; 379/88.2; 379/201.11; 379/207.15
(58) Field of Search ........................... 379/67.1, 69, 70, 379/76, 88.01, 88.02, 88.04, 88.08, 88.16, 88.19, 88.2, 88.21, 88.26, 201.01, 207.13, 207.15, 210.02, 201.11

(56) References Cited

U.S. PATENT DOCUMENTS

| | | | |
|---|---|---|---|
| 4,850,013 A | | 7/1989 | Rose |
| 5,351,289 A | | 9/1994 | Logsdon et al. |
| 5,631,951 A | | 5/1997 | Chen |
| 5,644,629 A | * | 7/1997 | Chow .......................... 379/142 |
| 5,661,788 A | | 8/1997 | Chin |
| 5,724,423 A | * | 3/1998 | Khello .......................... 380/23 |
| 5,787,157 A | | 7/1998 | Garfin et al. |
| 5,812,648 A | | 9/1998 | Wanner |
| 5,883,942 A | * | 3/1999 | Lim et al. .................... 379/142 |
| 5,978,451 A | * | 11/1999 | Swan et al. ............... 379/88.24 |
| 6,031,899 A | * | 2/2000 | Wu .............................. 379/142 |
| 6,173,041 B1 | * | 1/2001 | Borland et al. ............. 379/67.1 |

\* cited by examiner

Primary Examiner—Allan Hoosain
(74) Attorney, Agent, or Firm—Larson & Taylor, PLC

(57) ABSTRACT

A method is provided for preventing the transmission of unsolicited phone calls. The telephone number corresponding to the source of the phone call is first compared with a reject list and with an approved list to determine whether the call should be transmitted to the user. If the telephone number corresponding to the source of the phone call is not on either list, a registration procedure is carried out. Upon being successfully registered, the phone call is transmitted to the user and the source is added to the approved list.

8 Claims, 1 Drawing Sheet

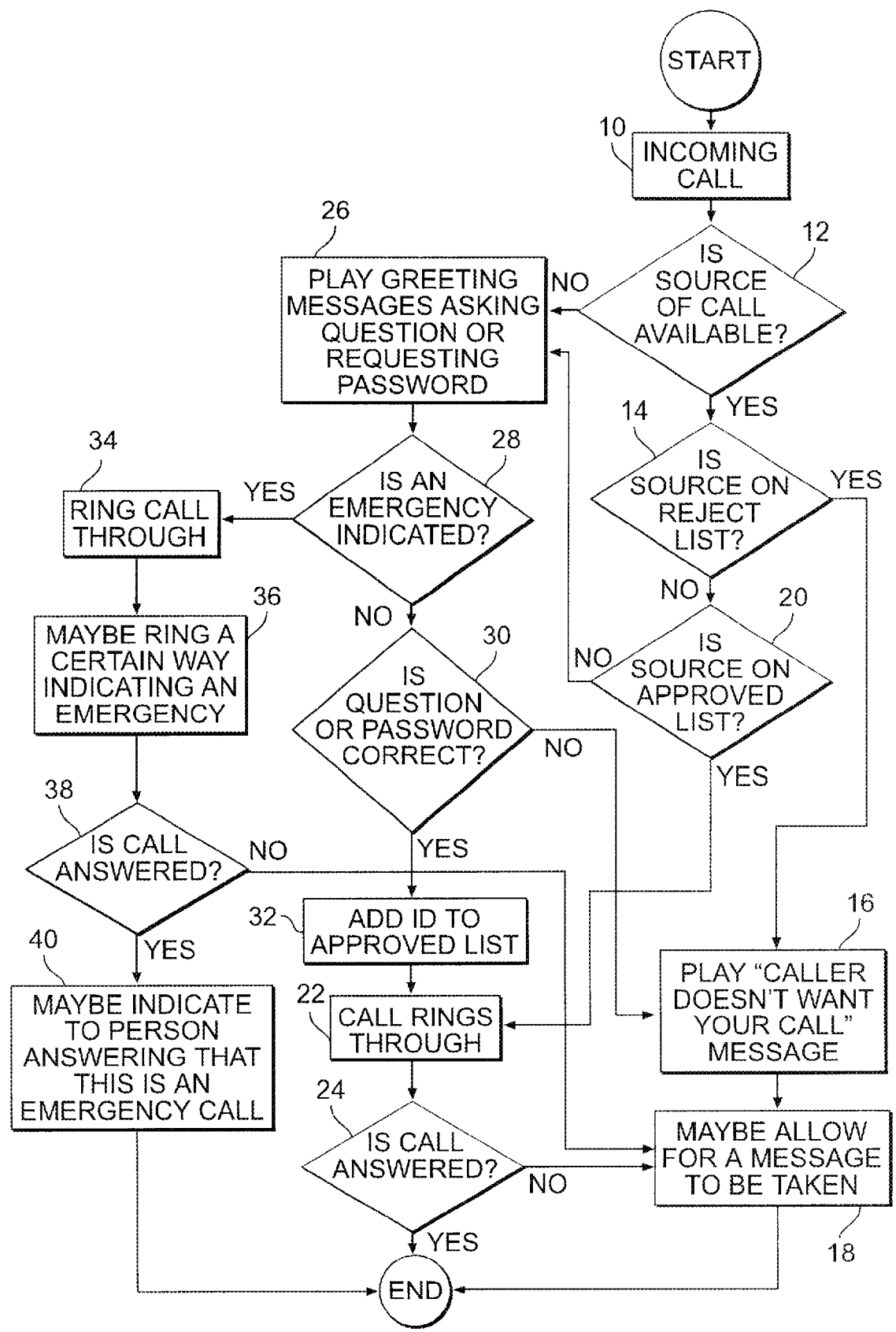

UNSOLICITED PHONE CALL REMOVAL SYSTEM

BACKGROUND OF THE INVENTION

1. Field of the Invention

The present invention relates to a method for preventing the transmission of unsolicited phone calls.

2. Related Art

Receiving unsolicited phone calls is a problem many people wish to avoid. Attempts have been made to reduce the quantity of unsolicited phone calls, but these have not been effective. Some methods include the burdensome step of requiring the caller to input the telephone number from which the caller is calling from every time a call is made. The inputted number is then compared with numbers on a list and a determination is made as to whether or not the call should be accepted. Other systems require the caller to input a password every time a call is placed.

Electronic devices, such as caller ID devices, have been developed to allow a user to identify the source of an incoming call. However, even with such devices, when the user receives an unwanted call, the user is inconvenienced by the telephone ringing and must go to and view the electronic device and then decide whether or not to take the telephone call.

SUMMARY OF THE INVENTION

According to the invention, a method for preventing the transmission of unsolicited phone calls is provided which is effective while minimizing the burden on callers.

In accordance with a first embodiment of the invention, a method for preventing the transmission of unsolicited phone calls is provided which comprises the steps of: interrupting a telephone call from a source to a user; processing available information to identify a source telephone number corresponding to the source of the call with an electronic identification means; comparing the source telephone number with a reject list of telephone numbers with an electronic comparison means; playing a recorded message indicating that the user does not wish to accept calls from the source of the call when the source telephone number is on the reject list; comparing the source telephone number with an approved list of telephone numbers with an electronic comparison means; allowing the telephone call to pass from the source to the user when the source telephone number is on the approved list; requesting that the source of the call complete a registration process when the source telephone number is not on either one of the reject list and the approved list; and updating the approved list by adding the source telephone number to the approved list and allowing the telephone call to pass from the source to the user when the source properly completes the registration process.

In a preferred embodiment, the registration process comprises entering a password. Advantageously the password is entered via a touch tone keypad on a telephone or is entered verbally and analyzed through a voice recognition procedure.

The method for preventing the transmission of unsolicited phone calls preferably includes the steps of: requesting that the source indicate whether the call is an emergency when the source telephone number is not on either one of the reject list and the approved list or when the source cannot be identified with the electronic identification means; and causing the user's telephone to ring in a distinctive manner to indicate that the source has indicated that the call is an emergency when the source indicates that the call is an emergency.

In another preferred implementation, the method for preventing the transmission of unsolicited phone calls further includes the steps of: requesting the source to indicate whether the call is an emergency when the source telephone number is not on either one of the reject list and the approved list or when the source telephone number cannot be identified with the electronic identification means; and playing a message to the user indicating that the call is an emergency when the source indicates that the call is an emergency.

The method for preventing the transmission of unsolicited phone calls preferably allows the source to leave a message when the source telephone number is on the reject list or when the source does not properly complete the registration process.

Other features and advantages of the invention will be set forth in, or apparent from, the following detailed description of the preferred embodiments of the invention.

BRIEF DESCRIPTION OF THE DRAWING

The single FIGURE in the drawings is a flow chart illustrating a method for preventing the transmission of unsolicited phone calls in accordance with a preferred embodiment of the invention.

DESCRIPTION OF THE PREFERRED EMBODIMENTS

Referring to the drawing, the basic steps in a method for preventing the transmission of unsolicited phone calls are illustrated. In a first step, indicated by block 10, an incoming call is placed by a source (not shown). Then, in a following step indicated by decision diamond 12, it is determined whether the source telephone number corresponding to the source of the incoming call can automatically be identified. The source telephone number of the incoming call is preferably identified through the use of an electronic device, such as a caller ID device.

If the source telephone number can be identified, then, in a further step, indicated by decision diamond 14, it is determined whether the source telephone number is on a reject list. The reject list contains a list of telephone numbers from which the user does not wish to receive telephone calls. If the source telephone number is on the reject list, in a step 16, a prerecorded message is played informing the caller that the user does not wish to accept telephone calls from the source. In a preferred embodiment, of step 16 the user may record any message the user wants to be played. In addition, more than one message may be recorded so that a customized message may be played to one or more sources. In an alternative embodiment, a step 18 allows a message to be taken from sources on the reject lists. The user may also customize the system by combining steps 16 and 18 so that a message is taken for calls from some predetermined sources and calls from other predetermined sources are simply blocked.

In the event that the source telephone number is not on the reject list in step 14, it is determined whether the source telephone number is on an approved list, in a further step indicated by decision diamond 20. The approved list contains a list of telephone numbers from which the user wishes to receive telephone calls. If the source telephone number is on the approved list, the telephone rings in step 22. If the call is not answered by the user, as indicated by decision diamond 24, the user may elect to allow a message to be taken in step 18. The user can, of course, edit both the reject list and the approved list.

When either the source telephone number is not identified in step 12 or the source telephone number is not on the approved list in step 20, a registration procedure is begun, beginning with a further step 26. In step 26, a message is played asking the source to enter a password or answer a question. If a question is asked, the question should be one that can be answered by a source from which the user wishes to accept calls. In one preferred embodiment, the password or answer is entered via the touch tone keypad on the telephone. In another preferred embodiment, the answer is entered verbally and analyzed through the use of a voice recognition device or some other communication detection/ analysis unit.

After the source enters the password or answers the question in step 26, the source is then asked to indicate, in step 28, whether the telephone call is an emergency either verbally or through the use of the touch tone keypad on the telephone. If the source does not indicate that the call is an emergency in step 28, the password entered or question answered in step 26 is analyzed in a further step indicated by decision diamond 30.

When the correct password is not entered or the question discussed above is not answered correctly, a message is played informing the caller that the user does not wish to accept telephone calls from the source in a further step 16. As indicated by block 18, optionally, a message may be taken. Again, both steps 16 and 18 have been described in more detail above.

When the correct password is entered or the question is answered correctly, the source telephone number is added to the approved list in step 32 and the call rings through in step 22. Adding the source telephone number to the approved list will, of course, permit the next call from the source to go through without repeating the registration procedure. This feature is important in that it reduces the burden on the source which is desirable where the source is one from which the user desires to receive calls.

When the source identifies the incoming call as an emergency in step 28, the call rings through in a further step 34. In advantageous, optional step 36, the user may elect to have the telephone ring in a distinctive manner when the source indicates that the incoming call is an emergency. This has the effect of indicating to the user that the call may be from some one the user does not wish to receive calls from. It is noted that when a source telephone number is on the reject list, the source will not be able to cause the call to go through by indicating that the call is an emergency.

If an emergency call is answered in step 38, the user may elect to have a message played to the user indicating that the call is an emergency phone call in step 40. If the emergency call is not answered in step 38, the user may elect to allow the source to leave a message in step 18.

It is to be understood that the method of preventing unsolicited phone calls provided in accordance with the embodiments of the invention described above may be accomplished using either hardware or software located anywhere between the source of the incoming call and the user.

Although the invention has been described in detail with respect to preferred embodiments thereof it will be apparent to those skilled in the art that variations and modifications can be effected in these embodiments without departing from the spirit and scope of the invention.

What is claim is:

1. A method for preventing the transmission of unsolicited phone calls, said method comprising the steps of:

interrupting a telephone call from a source to a user;

processing available information to identify a source telephone number corresponding to the source of said call with an electronic identification means;

comparing said source telephone number with a reject list of telephone numbers with an electronic comparison means;

playing a recorded message indicating that said user does not wish to accept calls from said source of said call when said source telephone number is on said reject list;

comparing said source telephone number with an approved list of telephone numbers with an electronic comparison means;

allowing said telephone call to pass from said source to said user when said source telephone number is on said approved list;

requesting that said source of said call complete a registration process when said source telephone number is not on either one of said reject list and said approved list; and updating said approved list by adding said source telephone number to said approved list and allowing said telephone call to pass from said source to said user when said source properly completes said registration process.

2. The method for preventing the transmission of unsolicited phone calls according to claim 1, wherein said registration process comprises entering a password.

3. The method for preventing the transmission of unsolicited phone calls according to claim 2, wherein said password is entered via a touch tone keypad on a telephone.

4. The method for preventing the transmission of unsolicited phone calls according to claim 2, wherein said password is entered verbally and analyzed through a voice recognition procedure.

5. The method for preventing the transmission of unsolicited phone calls according to claim 1, further including the steps of:

requesting that the source indicate whether the call is an emergency when said source telephone number is not on either one of said reject list and said approved list or when said source cannot be identified with said electronic identification means; and causing said user's telephone to ring in a distinctive manner to indicate that the source has indicated that the call is an emergency when said source indicates that the call is an emergency.

6. The method for preventing the transmission of unsolicited phone calls according to claim 1, further including the steps of:

requesting the source to indicate whether the call is an emergency when said source telephone number is not on either one of said reject list and said approved list or when said source telephone number cannot be identified with said electronic identification means; and playing a message to said user indicating that the call is an emergency when said source indicates that the call is an emergency.

7. The method for preventing the transmission of unsolicited phone calls according to claim 1, further including the step of allowing said source to leave a message when said source telephone number is on said reject list.

8. The method for preventing the transmission of unsolicited phone calls according to claim 1, further including the step of allowing said source to leave a message when said source does not properly complete said registration process.

* * * * *